United States Patent Office

HENRY E. POND, OF FRANKLIN, MASSACHUSETTS.

Letters Patent No. 67,450, dated August 6, 1867.

---

IMPROVED ARTIFICIAL FERTILIZER.

---

The Schedule referred to in these Letters Patent and making part of the same.

---

TO ALL TO WHOM THESE PRESENTS SHALL COME:

Be it known that I, HENRY E. POND, of Franklin, in the county of Norfolk, and State of Massachusetts, have invented a new and useful Artificial Fertilizer; and do hereby declare the following to be a full, clear, and exact description of its ingredients and the process for manufacturing it.

In preparing the above-mentioned fertilizer, I take meadow muck, in the proportion of fifteen hundred pounds to two thousand pounds, and dry it, either naturally or artificially, until about one-half its moisture has been evaporated, and add to the mass twenty pounds, in the same ratio, of sulphuric acid, and mix the two thoroughly. After standing for about ten hours the mass should again be mixed or stirred; and lime to the amount of one hundred and fifty pounds, in above proportion, incorporated with it. I then take potash, salt, and soda, (nitrate,) in the proportions of fifty, eighty, and one hundred pounds, or thereabouts, and dissolve them in as little boiling water as will answer the purpose, and thoroughly mix the combination with the muck and acid. After standing for five hours, I add and thoroughly mix with the mass one hundred pounds, in proportion, of superphosphate of lime, and let the whole thoroughly dry, when it may be placed in barrels for transportation.

The above-described mixing process should be carried on as far as practicable in vats, air-tight or nearly so. The lime, superphosphate of lime, and salt may be added in varying proportions, according to the use required of the fertilizer, or other chemicals may be added.

My invention consists principally in the use of sulphuric acid, as applied to meadow muck or any equivalent or suitable base. The acid destroys the germs of sorrel and other plants and weeds, which would otherwise grow to a great extent. The fertilizer, under the formula substantially as before given, possesses great fertilizing properties, and can be manufactured at a cost very much below that of other artificial fertilizers in use.

I claim as my invention, and desire by Letters Patent, the new fertilizer, substantially as before described.

HENRY E. POND.

Witnesses:
FREDERICK CURTIS,
CHAS. L. TURNER.